United States Patent
Li (10) Patent No.: US 8,618,805 B2
(45) Date of Patent: Dec. 31, 2013

(54) BATTERY PACK WITH A BATTERY PROTECTION CIRCUIT

(75) Inventor: Guoxing Li, Sunnyvale, CA (US)

(73) Assignee: O2Micro, Inc., Santa Clara, CA (US)

( * ) Notice: Subject to any disclaimer, the term of this patent is extended or adjusted under 35 U.S.C. 154(b) by 477 days.

(21) Appl. No.: 12/709,730

(22) Filed: Feb. 22, 2010

(65) Prior Publication Data

US 2010/0141219 A1   Jun. 10, 2010

Related U.S. Application Data

(63) Continuation-in-part of application No. 11/774,331, filed on Jul. 6, 2007, now Pat. No. 7,667,435, which is a continuation of application No. 10/879,655, filed on Jun. 29, 2004, now abandoned, which is a continuation-in-part of application No. 10/832,620, filed on Apr. 27, 2004, now Pat. No. 7,589,499.

(60) Provisional application No. 60/556,254, filed on Mar. 25, 2004.

(51) Int. Cl.
  *G01N 27/416* (2006.01)
  *H02J 7/04* (2006.01)
  *H02H 3/20* (2006.01)
  *H02H 3/24* (2006.01)

(52) U.S. Cl.
  USPC ........... 324/433; 324/428; 324/434; 320/149; 361/90; 361/92

(58) Field of Classification Search
  USPC .......... 320/119–123, 149; 361/83, 86, 89, 90, 361/91.3, 92; 324/428, 433, 434
  See application file for complete search history.

(56) References Cited

U.S. PATENT DOCUMENTS

| | | | |
|---|---|---|---|
| 3,970,901 A | 7/1976 | Rohr | |
| 4,025,916 A * | 5/1977 | Arnold et al. | 340/636.16 |
| 5,307,000 A | 4/1994 | Podrazhansky et al. | |
| 5,517,379 A | 5/1996 | Williams et al. | |
| 5,539,299 A | 7/1996 | Fernandez et al. | |
| 5,686,817 A | 11/1997 | Sakoh et al. | |
| 5,789,902 A | 8/1998 | Abe et al. | |
| 5,808,446 A | 9/1998 | Eguchi | |
| 5,861,732 A | 1/1999 | Takimoto et al. | |
| 5,867,008 A | 2/1999 | Du et al. | |
| 5,903,137 A | 5/1999 | Freiman et al. | |
| 5,920,181 A | 7/1999 | Alberkrack et al. | |
| 6,111,388 A | 8/2000 | Mukainakano | |
| 6,118,253 A | 9/2000 | Mukainakano et al. | |
| 6,208,117 B1 | 3/2001 | Hibi | |
| 6,285,163 B1 | 9/2001 | Watanabe et al. | |
| 6,310,449 B1 | 10/2001 | Dorfer | |

(Continued)

FOREIGN PATENT DOCUMENTS

| | | |
|---|---|---|
| CN | 2031172 U | 1/1989 |
| CN | 101336399 A | 12/2008 |

(Continued)

*Primary Examiner* — Richard V Muralidar (57) ABSTRACT

A battery circuit includes a monitoring circuit, an integrator circuit, and a comparator. The monitoring circuit can be used to monitor a cell and generate a monitoring signal indicating a cell voltage of the cell. The integrator circuit accumulates a difference between the monitoring signal and a first predetermined threshold over a time period to generate an integrating output. The comparator compares the integrating output to a second predetermined threshold and generates a control signal.

23 Claims, 9 Drawing Sheets

(56) References Cited

U.S. PATENT DOCUMENTS

| | | |
|---|---|---|
| 6,313,606 B1 * | 11/2001 | Eguchi .................... 320/132 |
| 6,362,599 B1 | 3/2002 | Turner |
| 6,369,576 B1 | 4/2002 | Matthews et al. |
| 6,407,538 B1 | 6/2002 | Kinoshita et al. |
| 6,492,792 B1 | 12/2002 | Johnson, Jr. et al. |
| 6,495,989 B1 * | 12/2002 | Eguchi .................... 320/132 |
| 6,531,847 B1 | 3/2003 | Tsukamoto et al. |
| 6,563,318 B2 | 5/2003 | Kawakami et al. |
| 6,603,286 B2 | 8/2003 | Herrmann et al. |
| 6,844,702 B2 | 1/2005 | Giannopoulos et al. |
| 6,888,355 B2 | 5/2005 | Kitazawa et al. |
| 6,906,497 B2 | 6/2005 | Bucur et al. |
| 6,914,416 B2 | 7/2005 | Thomas et al. |
| 7,579,811 B2 | 8/2009 | Sato et al. |
| 8,203,314 B2 | 6/2012 | Odaohhara |
| 8,358,032 B2 | 1/2013 | Oga |
| 2002/0121880 A1 | 9/2002 | Yamanaka et al. |
| 2003/0169020 A1 | 9/2003 | Malcolm |
| 2005/0017688 A1 | 1/2005 | Stellberger |
| 2005/0212489 A1 * | 9/2005 | Denning et al. .......... 320/134 |
| 2006/0221528 A1 | 10/2006 | Li et al. |
| 2008/0012571 A1 * | 1/2008 | Ehrmann et al. .......... 324/434 |
| 2009/0219654 A1 | 9/2009 | Fitzpatrick |

FOREIGN PATENT DOCUMENTS

| | | |
|---|---|---|
| CN | 101438479 A | 5/2009 |
| EP | 0133968 A1 | 3/1985 |
| EP | 0181112 A2 | 5/1986 |
| GB | 2292845 A | 3/1996 |
| JP | 61221539 A | 10/1986 |
| JP | 08079982 A | 3/1996 |
| JP | 8140281 A | 5/1996 |
| JP | 9070145 A | 3/1997 |
| JP | 09130988 A | 5/1997 |
| JP | 09289738 A | 11/1997 |
| JP | 11178222 A | 7/1999 |
| JP | 2000069689 A | 3/2000 |
| JP | 2001190028 A | 7/2001 |
| TW | 200915699 A | 4/2009 |

* cited by examiner

BATTERY PACK WITH A BATTERY PROTECTION CIRCUIT

RELATED APPLICATION

This application is a continuation-in-part application of U.S. patent application Ser. No. 11/774,331, filed on Jul. 6, 2007, which is hereby incorporated by reference in its entirety and which itself is a continuation application of U.S. patent application Ser. No. 10/879,655 filed on Jun. 29, 2004, which itself is a continuation-in-part application of U.S. application Ser. No. 10/832,620 filed on Apr. 27, 2004, which is now U.S. Pat. No. 7,589,499, which claims priority to U.S. Provisional Application No. 60/556,254, filed on Mar. 25, 2004.

BACKGROUND

A variety of electronic devices may utilize a rechargeable battery. Such electronic devices may include laptop computers, cell phones, personal digital assistants, power tools, etc. A variety of rechargeable batteries may be utilized in such devices, e.g., lithium-ion, nickel-cadmium, and nickel-metal hydride batteries. Some rechargeable batteries, e.g., lithium-ion batteries, may become hazardous under certain conditions including over voltage conditions. Hence, a variety of battery protection circuits may be utilized in battery packs of such rechargeable batteries.

In some instances, a secondary battery protection circuit may be utilized in addition to a primary battery protection circuit. The secondary battery protection circuit may provide an output to a fuse element to permanently disable the fuse element in response to a sustained over voltage condition. However, such secondary protection circuit does not protect against short over voltage spikes. In addition, the fuse element is not capable of moving between conductive and non-conductive states since once the fuse element enters a non-conductive state, it cannot move back to a conductive state (i.e., once tripped the fuse element would need to be replaced).

Furthermore, conventional secondary battery pack protection circuits may not detect a relatively high voltage strike occurred at a relatively short time period.

SUMMARY

A battery circuit includes a monitoring circuit, an integrator circuit, and a comparator. The monitoring circuit can be used to monitor a cell and generate a monitoring signal indicating a cell voltage of the cell. The integrator circuit accumulates a difference between the monitoring signal and a first predetermined threshold over a time period to generate an integrating output. The comparator compares the integrating output to a second predetermined threshold and generates a control signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
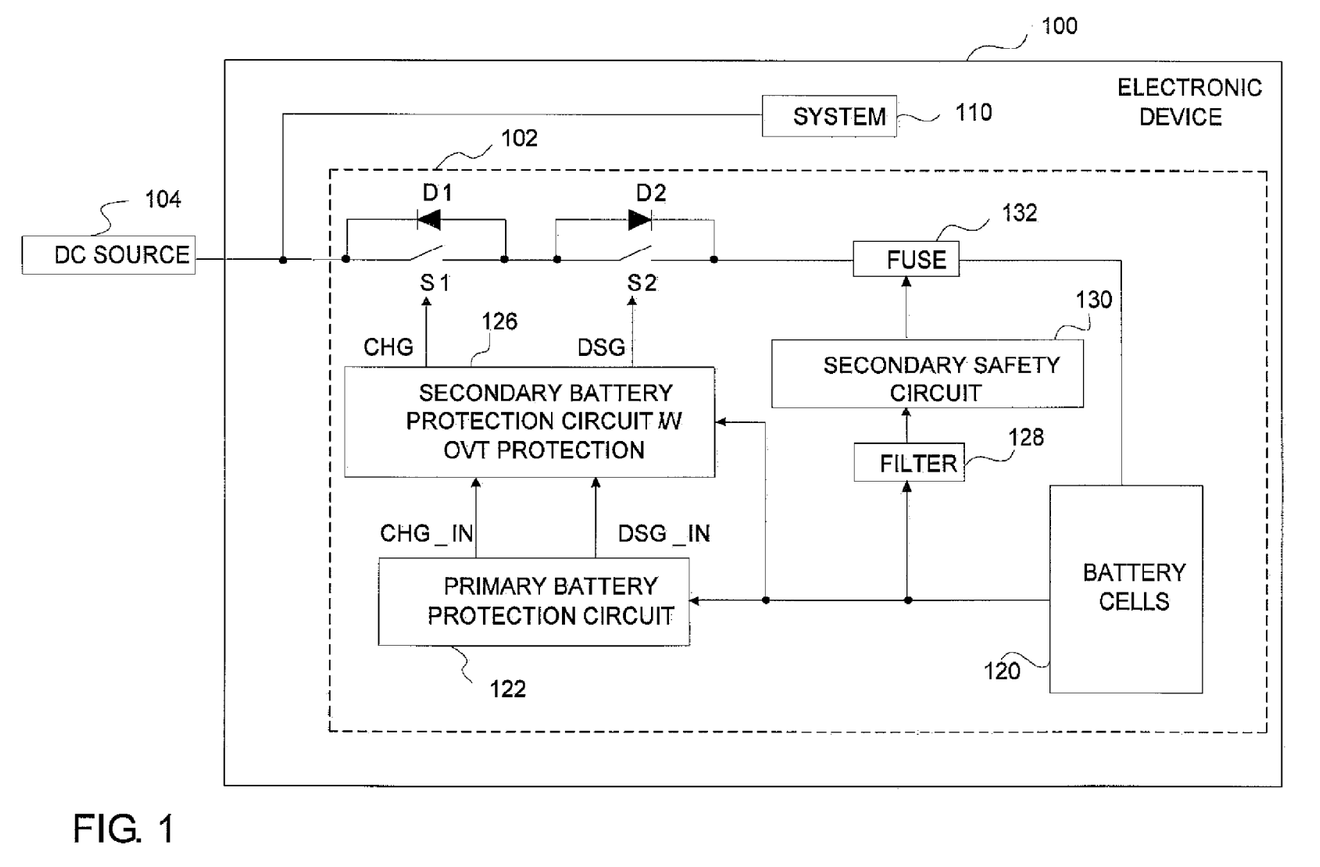
FIG. 1 is a block diagram of an electronic device having a secondary battery protection circuit with over voltage transient protection.

FIG. 1 is a block diagram of an electronic device 100 having a DC power source 104 and a battery pack 102 to supply power to the system 110. If the DC source 104 (e.g., an ACDC adapter) is not present, power may be supplied to the system 110 from the battery pack 102. If the DC source 104 is present, it may supply power to the system 110 and provide power to recharge the cells 120 of the battery. In a battery charging mode, switch S1 may be closed and switch S2 may be open in one instance. In this instance, current may then flow through closed switch S1 and diode D2 in parallel with open switch S2 to provide charging current to the cells 120. In another battery charging mode, both switches S1 and S2 may be closed to reduce losses due to the diode D2. In a battery supply mode, switch S1 may be open and switch S2 may be closed in one instance. Current from the battery cells 120 to the system 110 may then flow through closed switch S2 and diode D1 in parallel with open switch S1. In another battery supply mode, both switches S1 and S2 may be closed to reduce losses due to the diode D1.

The battery pack 102 may also include a primary battery protection circuit 122, a filter 128, a secondary safety circuit 130, a fuse element 132, and a secondary battery protection circuit 126 with over voltage transient (OVT) protection consistent with an embodiment. The primary battery protection circuit 122 may monitor a number of conditions including the voltage level of each of the cells 120 as well as charging and discharging current levels and provide charge (CHG_IN) and discharge control signals (DSG_IN). The voltage level of each of the cells 120 may also be monitored by the secondary safety circuit 130 via the filter 128. The filter 128 serves to filter out shorter duration over voltage transient spikes. The secondary safety circuit 130 monitors the voltage level of each of the cells 120 and provides a signal to the fuse element 132 to blow or open the fuse element 132 if a voltage level of one of the cells is greater than an over voltage threshold level for a sustained time interval. The filter 128 therefore serves to stop the fuse element 132 from blowing due to shorter duration over voltage transient spikes.

The battery pack 102 may also include a secondary battery protection circuit 126 with over voltage transient protection circuit to protect the cells 120 if the voltage level of any one of the cells is greater than an over voltage threshold level for a time interval less than or equal to a transient time interval. As used herein, a "transient time interval" is the time interval it takes for a permanent protection mechanism, e.g., fuse 132 in one instance, of an associated battery pack to be activated in case of a sustained over voltage condition. The transient time interval may vary based on the particular cell chemistry, the particular permanent protection mechanism, and other considerations. In one embodiment, the transient time interval may be about 10 microseconds (μs). As such, the secondary battery protection circuit 126 protects the cells 120 from shorter over voltage spikes that would otherwise not activate any other more permanent protection mechanisms. For example, the secondary battery protection circuit 126 may protect the cells 120 from a short over voltage spike having a magnitude of only 1 millivolt (mV) and a duration of only 1 μs.

In addition to protecting the cells 120 from over voltage transient conditions, the secondary battery protection circuit 126 may also protect the cells 120 from sustained over voltage conditions for time intervals greater than the transient time interval. With this capability, the secondary battery protection circuit 126 may provide, in part, a duplicative function of the secondary safety circuit 130. As such, one or more of the filter 128, secondary safety circuit 130, and fuse element 132 may be removed in the battery pack 102 saving component costs and space. Alternatively, such components 128, 130, 132 may be retained and the sustained over voltage protection feature of the secondary battery cell protection circuit 126 may provide an added layer of reliability.

Figure 2:
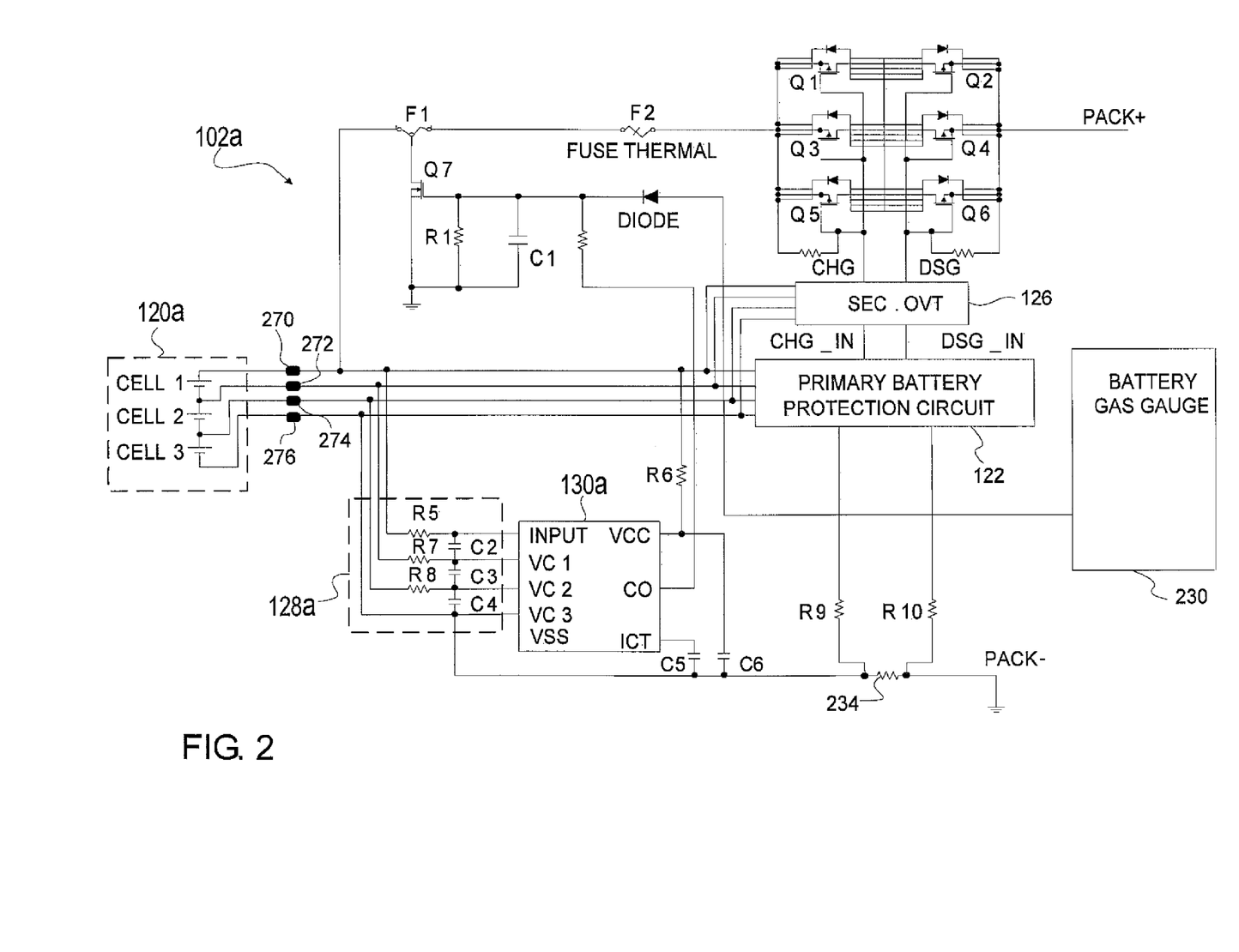
FIG. 2 is a block diagram of one embodiment of the battery pack of FIG. 1.

FIG. 2 is a block diagram of one embodiment of a battery pack 102a that may be utilized in the electronic device 100 of FIG. 1. The battery cells 120a may include cell1, cell2, and cell3. Each battery cell may be coupled to the primary battery protection circuit 122, the RC filtering network 128a, and the secondary battery protection circuit 126. The RC filtering network 128a may include resistors R5, R7, and R8 and capacitors C2, C3, and C4. In one embodiment, resistors R5, R7 and R8 may also be equal to 1 kilo-ohm (kΩ) and capacitors C2, C3, and C4 may all be equal to 0.1 microfarad (μF).

The RC filtering network 128a may filter out short duration over voltage transient conditions and provide an input to the secondary safety circuit 130a representative of the voltage level of each of the cells 120a. If the voltage level of any one of the cells (cell1, cell2, or cell3) exceeds an over voltage threshold level, e.g., 4.2 volts, for greater than a transient time interval, then the secondary safety circuit 130 may provide a control signal to the control terminal of transistor Q7 causing transistor Q7 to conduct and the fuse F1 to blow. An additional thermal fuse F2 may also be coupled in series with the fuse F1.

The charging switch S1 and discharging switch S2 functionality of FIG. 1 may be implemented with transistors Q1 through Q6 as illustrated in FIG. 2. The transistors Q1 through Q6 may be any variety of transistors including field effect transistors (FETs) such as a metal oxide semiconductor field effect transistors (MOSFETs) and bipolar junction transistors. A battery gas gauge circuit 230 may also be included in the battery pack 102a to monitor the capacity of the cells 120a and provide an output signal representative of the remaining capacity of the cells 120a based on a variety of monitored conditions. A sense resistor 234 may provide current information to the primary battery protection circuit 122.

The secondary battery protection circuit 126 may be positioned between the primary battery protection circuit 122 and the transistors Q1 through Q6. The secondary battery protection circuit 126 may accept a charging control signal (CHG_IN) and a discharge control signal (DSG_IN) from the primary battery protection circuit 122 and provide an output charging control signal (CHG) and discharge control signal (DSG) to the transistors Q1 through Q6. The secondary battery protection circuit 126 may also accept signals from the terminals 270, 272, 274, and 276 representative of the voltage level of the cells 120a. In general, the secondary battery protection circuit 126 may monitor the voltage level of each of the cells 120a and provide an output signal to the transistors Q1 through Q6 to protect the cells 120a in case of an over voltage transient condition.

Figure 3:
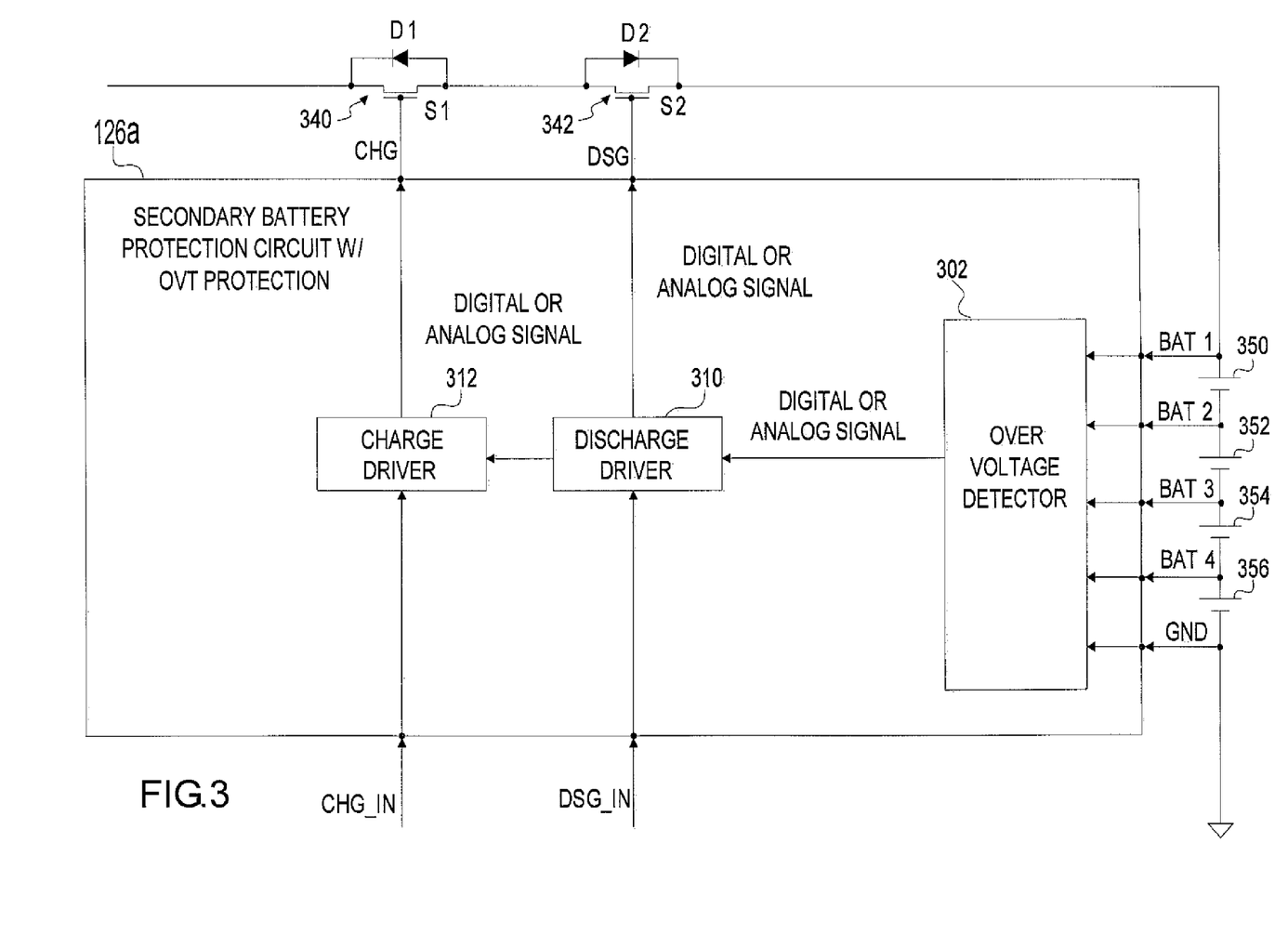
FIG. 3 is a block diagram of one embodiment of a secondary battery protection circuit with over voltage transient protection that may be utilized in the electronic device and battery pack of FIGS. 1 and 2.

FIG. 3 is block diagram of one embodiment of a secondary over voltage transient protection circuit 126a. The circuit 126a may include an over voltage detector circuit 302. The over voltage detector circuit 302 monitors the cell voltages of each cell 350, 352, 354, and 356 to detect any cell voltage level that exceeds an over voltage threshold level for any duration of time including those of short duration. The over voltage detector circuit 302 may then provide an output signal representative of whether a voltage level of any of the cells 350, 352, 354, and 356 is greater than an over voltage threshold level, e.g., 4.2 volts.

When the over voltage detector circuit 302 provides an output signal representative of a voltage level of one of the cells is greater than the over voltage threshold level, the secondary battery protection circuit 126a may then take steps to protect the cells 350, 352, 354, and 356 from such an over voltage transient condition. Such protection may include opening an appropriate switch S1 or S2 to isolate the cells from the over voltage condition. Such protection may also include increasing an internal resistance of the appropriate switch S1 or S2 when in a conducting state to limit the voltage level to the cells to an appropriate level.

The switches S1 and S2 may be any variety of transistors such as field effect transistors (FETs) 340, 342 with the secondary battery protection circuit 126a providing a control signal to the gate of the FETs. The control signal may be a digital signal or an analog signal. A digital signal may be utilized to drive the appropriate switch (switch S1 or S2) to an open state to isolate the cells from the over voltage transient condition. An analog signal may also be utilized to control the ON resistance of the switch (when the switch is in a conducting state) to limit the voltage level to the cells to an appropriate level. For instance, when the switch is an FET, the FET may be driven into saturation by the analog signal to cause the FET to act as a variable resistor. Hence, the ON resistance of the FET may be controlled by the analog signal to the desired level to limit the voltage level seen by the cells to an appropriate safe level.

Figure 4:
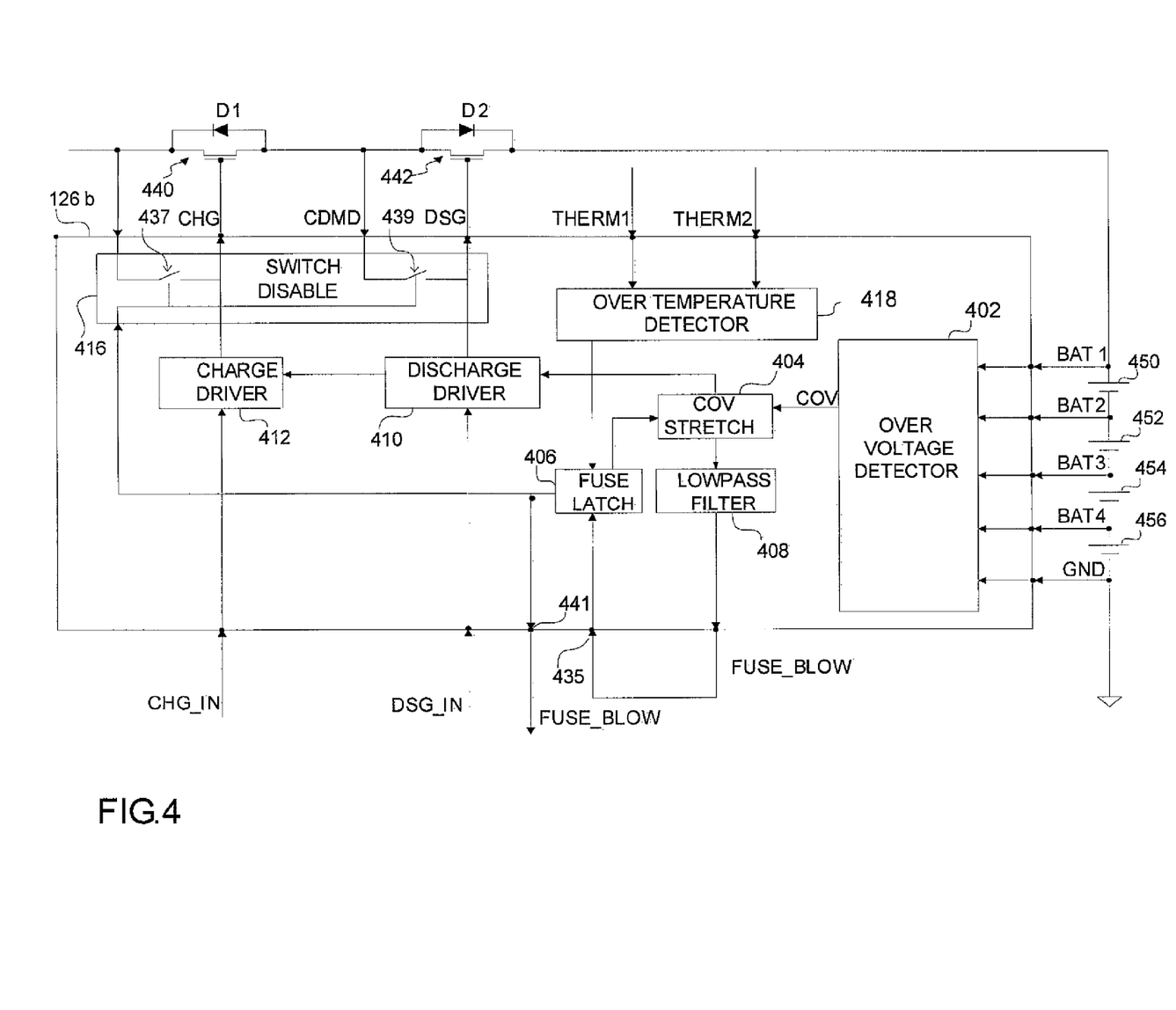
FIG. 4 is a block diagram of another embodiment of a secondary battery protection circuit with over voltage transient protection that may be utilized in the electronic device and battery pack of FIGS. 1 and 2.

Turning to FIG. 4, another embodiment of a secondary battery protection circuit 126b is illustrated. In addition to providing temporary protection to the cells from over voltage transient conditions, the secondary battery protection circuit 126b may also be capable of providing permanent protection to the cells from sustained over voltage conditions. The secondary battery protection circuit 126b may also further be capable of providing permanent protection to the cells from other adverse conditions such as an excessive temperature condition.

The secondary battery protection circuit 126b may include a cell over voltage detector circuit 402, a cell over voltage (COV) stretch circuit 404, a low-pass filter 408, a fuse latch 406, a charge driver 412, a discharge driver 410, a switch disable circuit 416, and an over temperature detector 418. The charge switch S1 and discharge switch S2 of FIG. 1 may be implemented as FETs 440 and 442 respectively.

The over voltage detector circuit 402 monitors the cell voltages of each cell 450, 452, 454, and 456 to detect any cell voltage level that exceeds an over voltage threshold level for any duration of time, even those of short duration. In one embodiment, the over voltage detector circuit 402 may have a switch network to couple each cell to one input of a comparator. The other input to the comparator may be a voltage level equal to the over voltage threshold level. The comparator may then compare a particular voltage level of a cell to the over voltage threshold level and provide an output representative of the results of that comparison.

The over voltage detector circuit 402 may then provide a cell over voltage (COV) digital signal to the COV stretch circuit 404. If the COV digital signal is representative of an over voltage transient condition, the COV stretch circuit 404 maintains that COV signal at that state for a minimum time interval. The COV stretch circuit 404 may also pass the COV signal through the low-pass filter 408 to reject short duration events and output a FUSE_BLOW signal if the COV signal remains high for greater than the transient time interval. The FUSE_BLOW signal may be internally generated as an output of the low-pass filter 408 or externally generated and input to the circuit 126b at terminal 435.

The FUSE_BLOW signal may be latched by the fuse latch 406 and used to permanently disable the charge FET 440 and/or discharge FET 442 by means of a FUSE_BLOWN control signal. The fuse latch 406 may be self resetting, persistent as long as power is applied to the circuit, or permanent by some method such as blowing a Zener-zap diode. In one instance, disabling of the FETs 440 and 442 may be accomplished by shorting the gate and source terminal of each FET. For example, this may be accomplished by the switch disable circuit 416 closing switch 437 to short the gate and source terminal of the charge FET 440 or closing switch 439 to short the source and gate terminal of the discharge FET 442. For additional protection, the FUSE_BLOWN control signal may also disable the FET drivers 412 and 410. The FUSE_BLOWN signal may be output at terminal 441 of the secondary battery protection circuit 126b to provide an indication of such status.

Additional protection features may also be implemented by feeding additional inputs to the fuse latch 406 representative of other adverse conditions that could trigger a permanent disabling of the FETs 440 and 442. Such an adverse condition may be an increased temperature condition, e.g., from the over temperature detector 418. This may be an increased temperature of the cells 120, switches S1 and S2, or other components. The secondary battery protection circuit 126b may be utilized in a battery pack with a thermal fuse F2 (see FIG. 2). The circuit 126b may be capable of protecting the cells 120 from a high temperature condition before the thermal fuse F2 is tripped thereby saving the tripping and replacement of a more expensive thermal fuse F2.

The COV signal from the over voltage detector circuit 402 may also be utilized to temporarily protect the cells 450, 452, 454, and 456 during an over voltage transient condition too short to trigger the FUSE_BLOW signal. In one instance, the COV signal may be input to the COV stretch circuit 404 to stretch or maintain a COV signal representative of an over voltage transient condition for a minimum time interval. This will help to prevent oscillation between opening and closing either the charge or discharge FETs 440 and 442 if short over voltage spikes occur close together.

Figure 5:
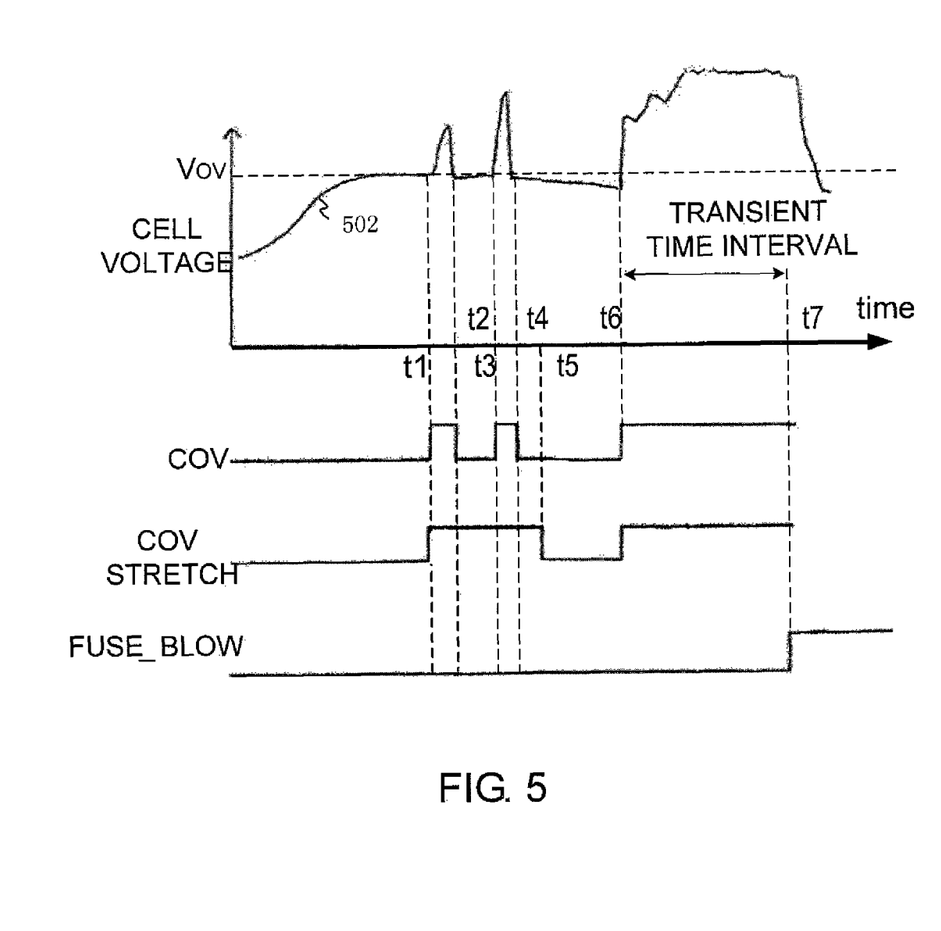
FIG. 5 is a plot of cell voltage over time illustrating short over voltage spikes and sustained over voltage conditions with associated control signals of the embodiment of FIG. 4.

FIG. 5 illustrates a plot 502 of cell voltage versus time in conjunction with the COV signal, the COV stretch signal, and the FUSE_BLOW signal of FIG. 4 to further explain operation of the secondary battery protection circuit 126b of FIG. 4. As long as the cell voltage is less than the over voltage threshold level (Vov), the over voltage detector circuit 402 may provide a digital zero COV signal.

Between times t1 and t2 and between times t3 and t4 an over voltage transient condition is illustrated where the voltage level of the particular cell exceeds Vov. Accordingly, the over voltage detector circuit 402 detects this condition and provides a digital one COV signal between times t1 and t2 and between times t3 and t4. The COV stretch circuit 404 may also provide a digital one signal COV stretch signal starting at time t1 continuing until time t5 to prevent the charge and/or discharge FETs 440 and 442 from opening and closing quickly. For example, during the time interval between times t1 and t5 the COV stretch signal may remain a digital one and the charge and/or discharge FETs 440 and 442 may remain open during this time interval to protect the cells against the over voltage transient conditions.

The over voltage transient conditions between times t1 and t2 and between times t3 and t4 might not be long enough to trigger the FUSE_BLOW signal. In other words, the time interval between times t1 and t2 and between times t3 and t4 might be less than or equal to the transient time interval. However, the over voltage condition starting at time t6 might be greater than the transient time interval (time between times t6 and t7) in order to trigger a permanent protection mechanism. For example, the FUSE_BLOW signal may provide a digital one signal at time t7 or the expiration of the transient time interval. This may then trigger an external fuse element (e.g., fuse element 132 of FIG. 1) and/or trigger the switch disable circuit 416 to permanently disable the FETs 440 and 442.

Therefore, the secondary battery protection circuit 126b may protect the cells from over voltage transient condition, from sustained over voltage conditions, and from other adverse conditions such as excessive temperature. Therefore, (with reference to FIG. 1), one or more of the secondary safety circuit 130, filter 128, and fuse element 132 may be eliminated saving component cost and space. Alternatively, such components 130, 128, 132 may be retained and the sustained over voltage protection feature of the secondary battery protection circuit 126 may provide an added layer of reliability for the cells.

In summary, there is provided a secondary battery protection circuit. The circuit may include an over voltage detector circuit configured to monitor a voltage level of an associated cell of a rechargeable battery and provide an output signal to a switch in response to a comparison of the voltage level of the cell to an over voltage threshold level. The switch may be coupled between the rechargeable battery and a DC power source and capable of moving between conducting and non-conducting states. The switch is also responsive to the output signal to protect the rechargeable battery if the voltage level of the cell is greater than the over voltage threshold level for a time interval less than or equal to a transient time interval.

There is also provided a battery pack including a primary battery protection circuit configured to monitor a condition of a rechargeable battery and provide a charge signal and a discharge signal. The battery pack may also include a secondary battery protection circuit configured to receive the charge and discharge signals from the primary circuit and provide a charge driving output signal and a discharge driving output signal. The secondary battery protection circuit may be configured to monitor a voltage level of at least one cell of the rechargeable battery. The battery pack may also include a charge switch coupled between the rechargeable battery and a DC power source and capable of moving between conducting and non-conducting states. The charge switch may be responsive to the charge driving output signal from the secondary battery protection circuit to protect the rechargeable battery if the voltage level of the cell is greater than the over voltage threshold level during a battery charging mode for a time interval less than or equal to a transient time interval. An electronic device including such a battery pack is also provided.

Advantageously, the secondary battery protection circuit protects the cells of a rechargeable battery against over voltage transient conditions that would otherwise be seen by the cells. Such over voltage transient conditions include any small increase in cell voltage above the over voltage threshold level for a short duration of time less than a transient time interval. The secondary battery protection circuit can also provide backup permanent protection mechanisms for the cells of the rechargeable battery in case of a sustained over voltage condition of a duration greater than the transient time interval. This can enable other circuits providing similar sustained over voltage protection to be eliminated or retained for added redundancy.

Figure 6A:
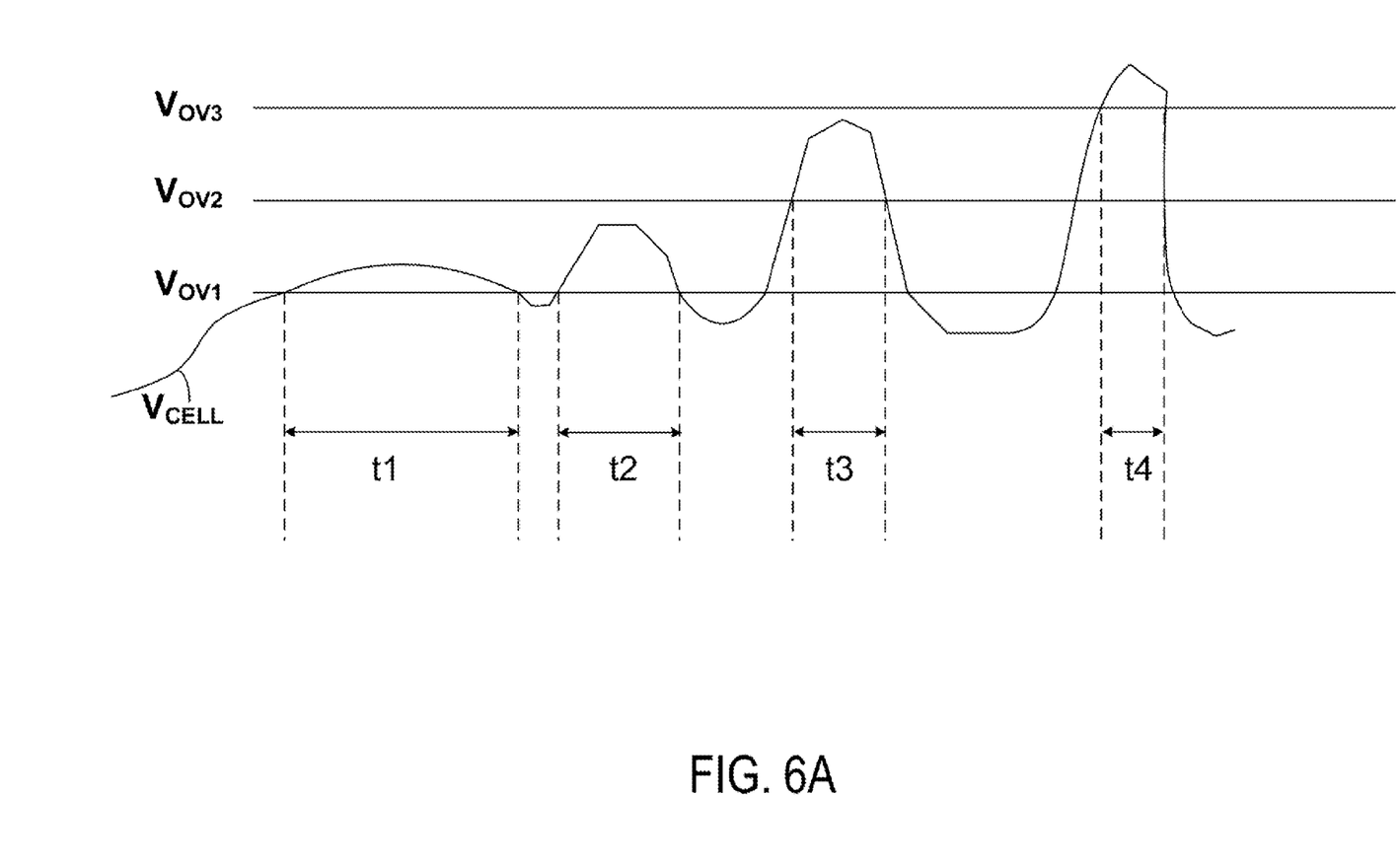
FIG. 6A shows a plot of a voltage over time illustrating battery protection, e.g., over voltage transient protection, using multiple voltage thresholds, in accordance with one embodiment of the present invention.

FIG. 6A shows a plot of a cell voltage over time illustrating battery protection, e.g., over voltage transient protection, using multiple voltage thresholds, in accordance with one embodiment of the present invention. In one embodiment, $V_{OV1}$, $V_{OV2}$ and $V_{OV3}$ can be over voltage thresholds and $V_{OV3} > V_{OV2} > V_{OV1}$. In the example of FIG. 6A, a cell voltage is monitored and compared to the voltage thresholds for illustrative purposes. However, the invention is not so limited; a battery voltage or an average cell voltage can also be compared to corresponding voltage thresholds.

In one embodiment, when the cell voltage exceeds, e.g., is greater than, a voltage threshold for a corresponding time interval, a protection action will be triggered to protect the battery from an undesired condition, e.g., an over voltage transient condition. For example, if the cell voltage exceeds the threshold $V_{OV1}$ over a predetermined time period $T_{OV1}$, an undesired condition, e.g., an over voltage transient condition, can be detected and a protection action can be triggered. If the cell voltage exceeds the threshold $V_{OV2}$ over a predetermined time period $T_{OV2}$, an undesired condition, e.g., an over voltage transient condition, can be detected and a protection action can be triggered. If the cell voltage exceeds the threshold $V_{OV3}$ over a predetermined time period $T_{OV3}$, an undesired condition, e.g., an over voltage transient condition, can be detected and a protection action can be triggered. In one embodiment, $T_{OV1} > T_{OV2} > T_{OV3}$. In one embodiment, each product of the over voltage threshold and the corresponding predetermined time period is the same, e.g., $V_{OV1}T_{OV1} = V_{OV2}T_{OV2} = V_{OV1}T_{OV3}$.

During the first time interval t1, the cell voltage exceeds the first over voltage threshold $V_{OV1}$. If t1 is equal to or greater than the predetermined time period $T_{OV1}$, an over voltage transient condition is detected and a protection action can be triggered. During the second time interval t2, the cell voltage exceeds the first over voltage threshold $V_{OV1}$. If t2 is less than the predetermined time period $T_{OV1}$, there is no over voltage transient condition. During the third time interval t3, the cell voltage exceeds the second over voltage threshold $V_{OV2}$. If t3 is equal to or greater than the predetermined time period $T_{OV2}$, an over voltage transient is detected and a protection action can be triggered. During the fourth time interval t4, the cell voltage exceeds the third over voltage threshold $V_{OV3}$. If t4 is equal to or greater than the predetermined time period $T_{OV3}$, an over voltage transient condition is detected and a protection action can be triggered accordingly.

By employing multiple thresholds and multiple predetermined time periods, and monitoring the time period when a cell voltage (or battery voltage or average cell voltage) exceeds a threshold, a high voltage spike occurred during a relatively short time interval can be detected. Although three voltage thresholds is shown in FIG. 6A, other number of the voltage thresholds can be used.

Figure 6B:
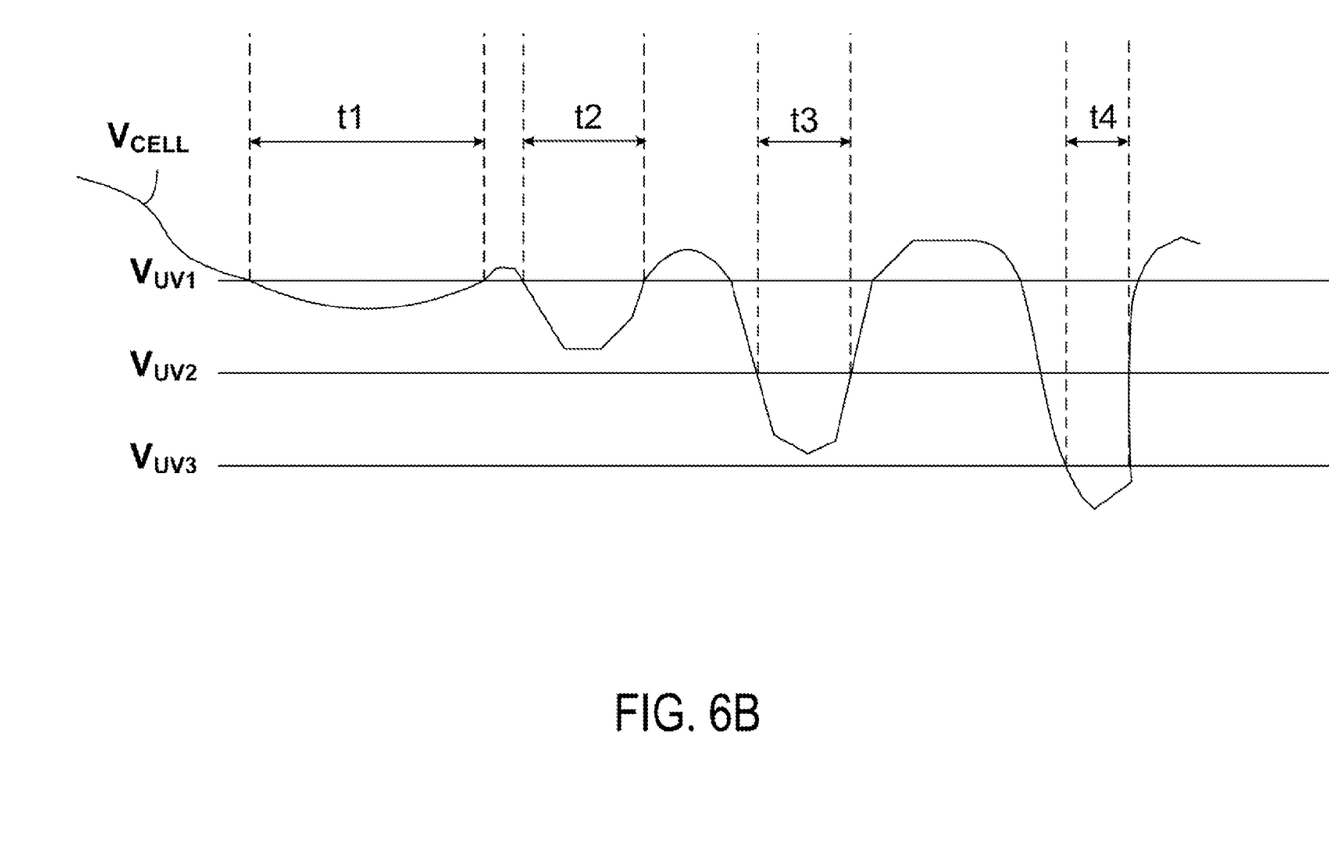
FIG. 6B shows a plot of a voltage over time illustrating battery protection, e.g., under voltage transient protection, using multiple voltage thresholds, in accordance with one embodiment of the present invention.

Similarly, FIG. 6B shows a plot of a voltage (e.g., a cell voltage, a battery voltage or an average cell voltage) over time illustrating battery protection, e.g., under voltage transient protection, using multiple voltage thresholds, in accordance with one embodiment of the present invention. In one embodiment, $V_{UV1}$, $V_{UV2}$ and $V_{UV3}$ can be under voltage thresholds and $V_{UV3} < V_{UV2} < V_{UV1}$.

In one embodiment, when the cell voltage is less than a voltage threshold for a corresponding time interval, a protection action will be triggered to protect the battery from an undesired condition, e.g., an under voltage transient condition. For example, if the cell voltage is less than the threshold $V_{UV1}$ over a predetermined time period $T_{UV1}$, an under voltage transient condition is detected and a protection action can be triggered. If the cell voltage is less than the threshold $V_{UV2}$ over a predetermined time period $T_{UV2}$, an under voltage transient condition is detected and a protection action can be triggered. If the cell voltage is less than the threshold $V_{UV3}$ over a predetermined time period $T_{UV3}$, an under voltage transient condition is detected and a protection action can be triggered. In one embodiment, $T_{UV1} > T_{UV2} > T_{UV3}$.

Figure 7:
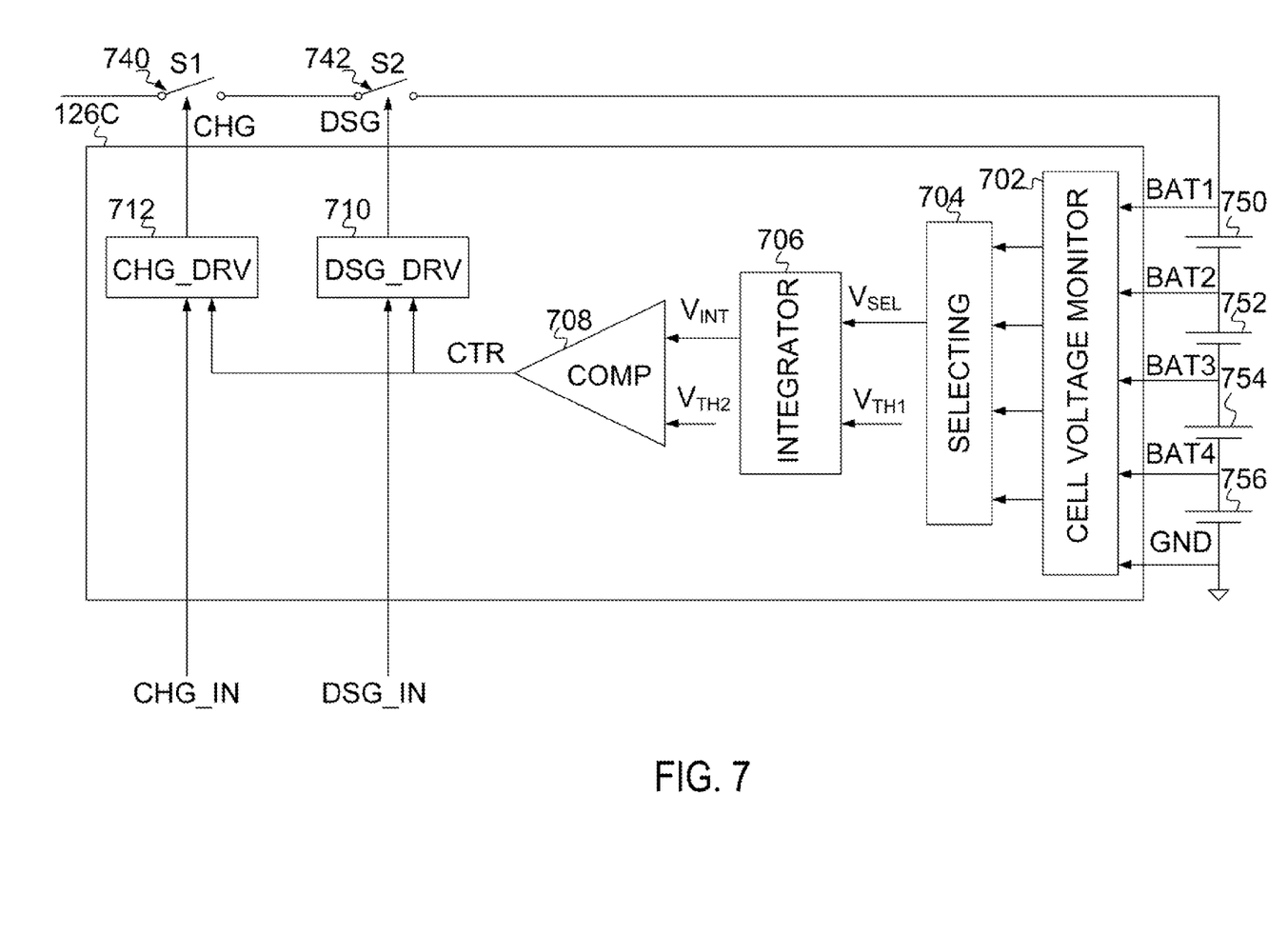
FIG. 7 is a block diagram of a battery pack having a battery protection circuit, in accordance with one embodiment of the present invention.

FIG. 7 illustrates block diagram of a battery pack including a battery protection circuit, in accordance with one embodiment of the present invention. The battery pack includes one or more battery cells, a charging switch 740, a discharging switch 742, and a battery protection circuit 126C. In the example of FIG. 7, battery cells 750, 752, 754 and 756 are coupled in series for illustrative purposes. The charging switch 740 and the discharging switch 742 may be various types of switches such as field effect transistors (FETs).

The battery protection circuit 126C is coupled to the battery cells, the charging switch 740, and the discharging switch 742. The battery protection circuit 126C can monitor cell voltages and compare a cell voltage to a predetermined threshold. In one embodiment, the battery protection circuit 126C can be used to detect an over voltage transient condition or an under voltage transient condition of the battery cells, and to trigger a protection action. The battery protection circuit 126C may include a cell voltage monitor 702, a selecting circuit 704, an integrator circuit 706, a comparator 708, a charge driver 712, and a discharge driver 714.

The cell voltage monitor 702 can receive the cell terminal voltages of each battery cell 750, 752, 754 and 756 and provide cell voltages of the battery cells 750, 752, 754 and 756, respectively. The selecting circuit 704 can receive the cell voltages of the cells 750, 752, 754 and 756 from the cell voltage monitor 702, and select a cell voltage, in one embodiment. The selecting circuit 704 may include a winner-take-all circuit, in one embodiment. In one embodiment, the selecting circuit 704 can select the highest cell voltage of the cells 750, 752, 754 and 756 for detecting an over voltage transient condition. In another embodiment, the selecting circuit 704 can select the lowest cell voltage of the cells 750, 752, 754 and 756 for detecting an under voltage transient condition.

An integrator circuit 706 receives the selected voltage $V_{SEL}$, e.g., the highest cell voltage of the cells or the lowest cell voltage of the cells. The integrator circuit 706 also receives a first predetermined threshold $V_{TH1}$. In one embodiment, for an over voltage protection, the first predetermined threshold $V_{TH1}$ represents an over voltage threshold, for example, 4.2V. In another embodiment, for an under voltage protection, the first predetermined threshold $V_{TH1}$ represents an under voltage threshold, for example, 3.0V. The integrator circuit 706 can integrate a difference between the selected voltage $V_{SEL}$ and the first predetermined threshold $V_{TH1}$ for a period of time and generate an integrating output $V_{INT}$. In one embodiment, the integrator circuit 706 may be implemented by a switching capacitor integrator.

The comparator 708 receives the output $V_{INT}$ of the integrator circuit 706 and a second predetermined threshold $V_{TH2}$. The comparator compares the output of the integrator circuit 706 $V_{INT}$ to the second predetermined threshold $V_{TH2}$ and outputs a control signal CTR. In one embodiment, for an over voltage protection, when the integrator circuit output $V_{INT}$ exceeds the second predetermined threshold $V_{TH2}$, the comparator 708 can generate a control signal CTR which indicates that an over voltage transient condition occurs. The output control signal CTR may be utilized to turn off the charging switch 740 via the charge driver 712, and thus battery charging can be terminated to protect the battery cells from the over voltage transient condition. In another embodiment, for an under voltage protection, when the integrator circuit output $V_{INT}$ exceeds the second predetermined threshold $V_{TH2}$, the comparator 708 can generate a control signal CTR which indicates that an under voltage transient condition occurs. The output control signal CTR may be utilized to turn off the discharging switch 742 via the discharge driver 710, and thus battery discharging can be terminated to protect the battery cells from the under voltage transient condition.

Figure 8:
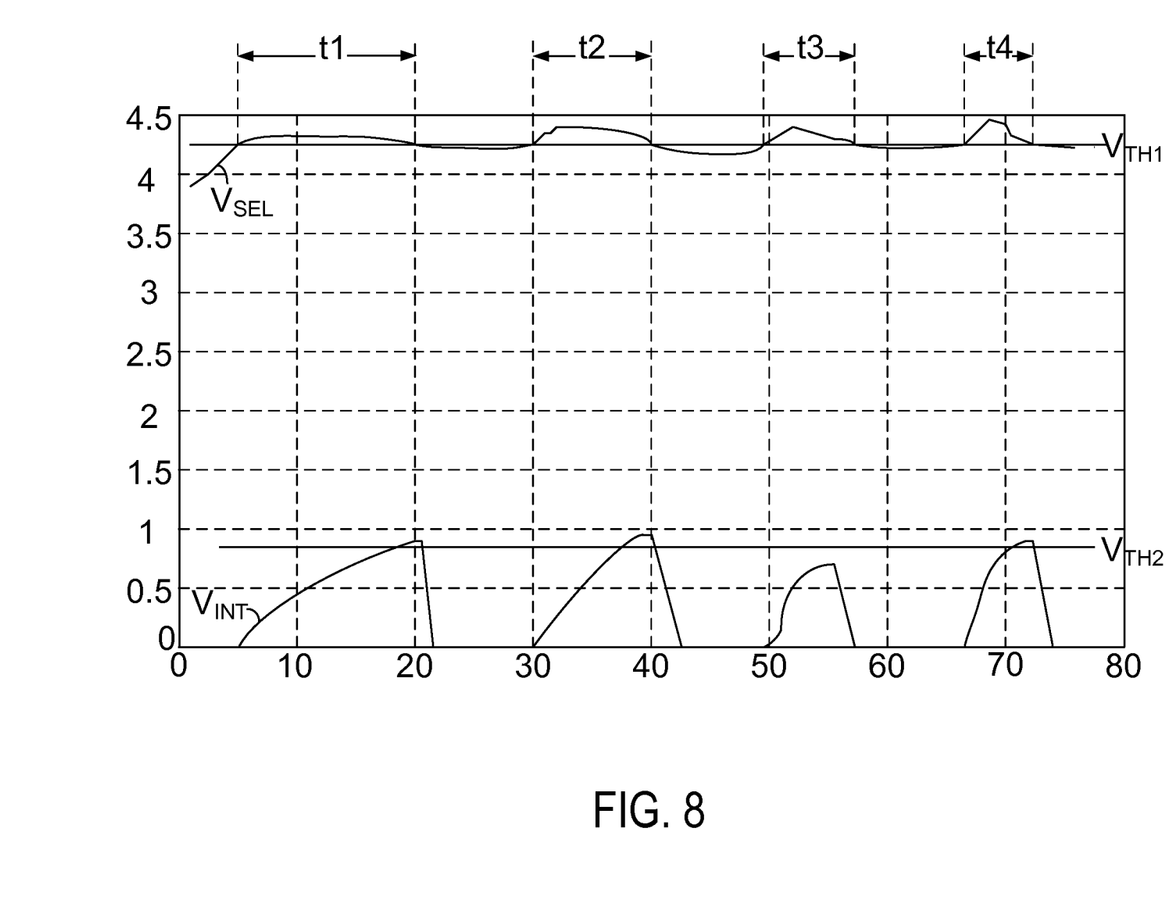
FIG. 8 illustrates waveforms of signals generated or received by a battery protection circuit of FIG. 7, in accordance with one embodiment of the present invention.

FIG. 8 illustrates waveforms of signals generated or received by the battery protection circuit of FIG. 7, in accordance with one embodiment of the present invention. FIG. 8 is described in combination with FIG. 7. For illustrative purposes, FIG. 8 shows an example for an over voltage detection. During the first time interval t1, the selected cell voltage $V_{SEL}$ from the selecting circuit 704 exceeds the first predetermined threshold $V_{TH1}$. The integrator circuit 706 accumulates a difference between the selected cell voltage $V_{SEL}$ and the first predetermined threshold $V_{TH1}$. When the output signal $V_{INT}$ of the integrator circuit 706 exceeds the second predetermined threshold $V_{TH2}$ as shown in FIG. 8, an over voltage transient condition is detected, and the control signal CTR output by the comparator 708 can turn off the charging switch 740 to terminate battery charging.

During the second time interval t2, although the second time interval t2 is shorter than the first time interval t1, the selected cell voltage $V_{SEL}$ from the selecting circuit 704 during the second time interval t2 is greater than the selected cell voltage $V_{SEL}$ from the selecting circuit 704 during the first time interval t1. Accordingly, the output signal $V_{INT}$ of the integrator circuit may still exceed the second predetermined threshold $V_{TH2}$. As a result, an over voltage transient condition is detected, and the control signal CTR can turn off the charging switch 740 to terminate battery charging.

During the third time interval t3, the selected cell voltage $V_{SEL}$ exceeds the first predetermined threshold $V_{TH1}$. However, since the time period when the selected cell voltage exceeds the first predetermined threshold $V_{TH1}$ is relatively short, the output $V_{INT}$ of the integrator circuit 706 is less than the second predetermined threshold $V_{TH2}$ as shown in FIG. 8. Thus, there is no over voltage transient condition and the charging switch 740 can remain on.

During the fourth time interval t4, the time period when the selected cell voltage $V_{SEL}$ exceeds the first predetermined threshold $V_{TH1}$ is relatively short. However, since the selected cell voltage $V_{SEL}$ from the selecting circuit 704 during t4 is relatively high (e.g., a voltage spike), the output $V_{INT}$ of the integrator circuit 706 may still exceed the second predetermined threshold $V_{TH2}$ as shown in FIG. 8. Therefore, an over voltage transient condition can still be detected and the control signal CTR can turn off the charging switch 740 to terminate battery charging.

Accordingly, a battery circuit including a monitoring circuit, an integrator circuit, and a comparator can detect an undesired condition, e.g., an over voltage condition or an under voltage condition, and can trigger a corresponding protection action. The monitoring circuit can be used to monitor cell voltages. The integrator circuit can receive a monitoring signal indicative of a cell voltage and accumulates a difference between the monitoring signal and a predetermined threshold over a time period to generate an integrating output. The comparator compares the integrating output to a second predetermined threshold and generates a control signal. The control signal can be used to trigger a protection action, e.g., terminating battery charging or discharging. As a result, accuracy of the battery protection circuit can be improved. Moreover, the invention is not limited to over voltage or under voltage protection. The battery circuit including the monitoring circuit, the integrator circuit, and the comparator can also be used to detect whether a battery cell voltage, a battery pack voltage, or an average cell voltage is above or below one or more predetermined thresholds.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit comprising:
a monitoring circuit operable for monitoring a cell and generating a monitoring signal indicating a cell voltage of said cell;
a switch coupled in series with said cell;
an integrator circuit coupled to said monitoring circuit and operable for receiving said monitoring signal and a first predetermined threshold and for accumulating a difference between said monitoring signal and said first predetermined threshold over a time period to generate an integrating output; and
a comparator coupled to said integrator circuit and operable for comparing said integrating output to a second predetermined threshold, and for generating a control signal to switch off said switch if said integrating output exceeds said second predetermined threshold.

2. The circuit of claim 1, wherein said monitoring circuit comprises a selecting circuit operable for selecting said monitoring signal from a plurality of monitoring signals indicating a plurality of cell voltages respectively.

3. The circuit of claim 2, wherein said monitoring signal indicates the highest cell voltage of said cell voltages, and wherein said first predetermined threshold indicates an over voltage threshold.

4. The circuit of claim 2, wherein said monitoring signal indicates the lowest cell voltage of said cell voltages, and wherein said first predetermined threshold indicates an under voltage threshold.

5. A battery pack comprising:
a plurality of cells;
a switch coupled in series with said cells; and
a battery protection circuit coupled to said cells and operable for accumulating a difference between a first signal indicating a cell voltage and a predetermined over voltage threshold over a time period to generate an integrating output and for generating a control signal according to a comparison of said integrating output and a second predetermined threshold,
wherein said switch is switched off in response to said control signal to protect said battery pack from an over voltage transient condition if said integrating output exceeds said second predetermined threshold.

6. The battery pack of claim 5, wherein said battery protection circuit comprises a comparator operable for generating said control signal according to said comparison of said integrating output and said second predetermined threshold.

7. A method comprising:
monitoring a plurality of cell voltages of a plurality of battery cells;
accumulating a difference between a monitoring signal indicating a cell voltage and a first predetermined threshold over a time period for generating an integrating output;
generating a control signal according to a comparison of said integrating output and a second predetermined threshold; and
switching off a switch in series with said battery cells in response to said control signal if said integrating output exceeds said second predetermined threshold.

8. The method of claim 7, further comprising:
selecting said monitoring signal from a plurality of monitoring signals indicating said cell voltages respectively.

9. The method of claim 7, wherein said monitoring signal indicates the highest cell voltage of said cell voltages, and wherein said first predetermined threshold indicates an over voltage threshold.

10. The method of claim 7, wherein said monitoring signal indicates the lowest voltage of said cell voltages, and wherein said first predetermined threshold indicates an under voltage threshold.

11. The battery pack of claim 5, wherein said battery protection circuit comprises an integrator circuit operable for accumulating said difference between said first signal and said predetermined over voltage threshold over said time period to generate said integrating output.

12. The battery pack of claim 5, wherein said battery protection circuit is further operable for selecting said first signal from a plurality of signals indicating a plurality of cell voltages of said cells respectively.

13. The battery pack of claim 12, wherein said first signal indicates the highest cell voltage of said cell voltages.

14. The battery pack of claim 5, wherein charging of said battery pack is terminated if said switch is switched off.

15. A method for protecting a battery, said method comprising:
monitoring a cell voltage of a cell in said battery;
comparing said cell voltage to a first predetermined threshold and a second predetermined threshold;
comparing a first time duration when said cell voltage exceeds said first predetermined threshold to a first predetermined time period if said cell voltage exceeds said first predetermined threshold;
detecting a first undesired condition if said first time duration exceeds said first predetermined time period;
comparing a second time duration when said cell voltage exceeds said second predetermined threshold to a second predetermined time period if said cell voltage exceeds said second predetermined threshold;
detecting a second undesired condition if said second time duration exceeds said second predetermined time period,
wherein said first predetermined threshold is greater than said second predetermined threshold, and wherein said first predetermined time period is less than said second predetermined time period.

16. The method of claim 15, wherein a product of said first predetermined threshold and said first predetermined time period is equal to a product of said second predetermined threshold and said second predetermined time period.

17. The method of claim 15, further comprising:
terminating charging of said battery if said first undesired condition is detected; and
terminating charging of said battery if said second undesired condition is detected.

18. The method of claim 15, wherein said first predetermined threshold represents a first over voltage threshold, and wherein said second predetermined threshold represents a second over voltage threshold.

19. A battery pack comprising:
a plurality of cells;
a switch coupled in series with said cells; and
a battery protection circuit coupled to said cells and operable for accumulating a difference between a first signal indicating a cell voltage and a predetermined under voltage threshold over a time period to generate an integrating output and for generating a control signal according to a comparison of said integrating output and a second predetermined threshold, wherein said switch is switched off in response to said control signal to protect said battery pack from an under voltage transient condition if said integrating output exceeds said second predetermined threshold.

20. The battery pack of claim 19, wherein said battery protection circuit comprises an integrator circuit operable for accumulating said difference between said first signal and said predetermined under voltage threshold over said time period to generate said integrating output.

21. The battery pack of claim 19, wherein said battery protection circuit comprises a comparator operable for generating said control signal according to said comparison of said integrating output and said second predetermined threshold.

22. The battery pack of claim 19, wherein said battery protection circuit is further operable for selecting said first signal from a plurality of signals indicating a plurality of cell voltages of said cells respectively.

23. The battery pack of claim 22, wherein said first signal indicates the lowest cell voltage of said cell voltages.

* * * * *